G. W. LAWBAUGH.
Cultivator Teeth.
No. 100,298.    Patented March 1, 1870.
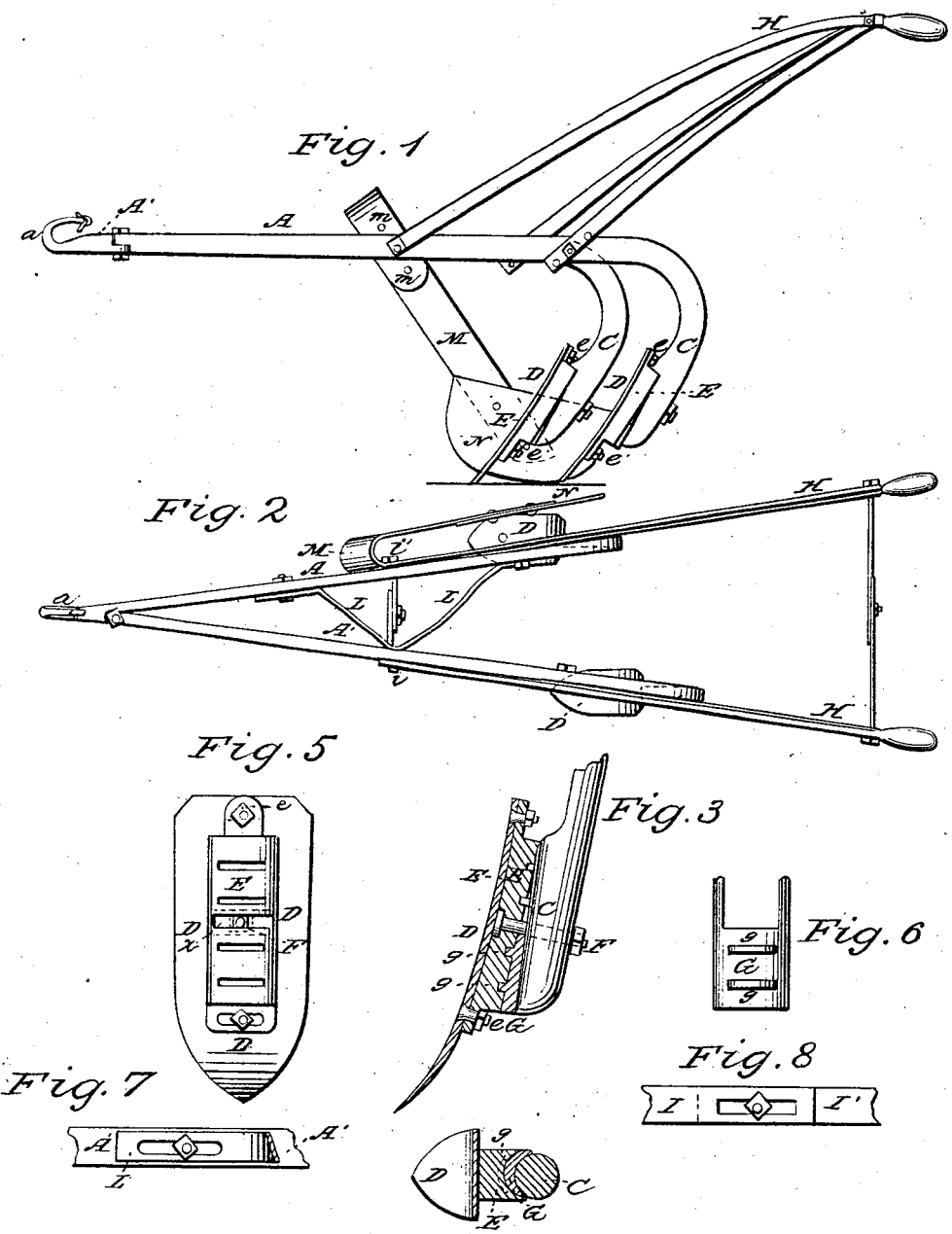

UNITED STATES PATENT OFFICE.

G. W. LAWBAUGH, OF GENESEE, ILLINOIS.

IMPROVEMENT IN DOUBLE-SHOVEL PLOWS.

Specification forming part of Letters Patent No. 100,298, dated March 1, 1870; antedated February 26, 1870.

*To all whom it may concern:*

Be it known that I, G. W. LAWBAUGH, of Genesee, in the county of Henry, and in the State of Illinois, have invented certain new and useful Improvements in Double-Shovel Plows; and I do hereby declare that the following is a full, clear, and exact description thereof, reference being had to the accompanying drawings, making a part of this specification, in which—

Figure 1 is a side elevation of my improved plow. Fig. 2 is a plan view of the same. Fig. 3 is a vertical central section of a shovel and the devices for adjusting the same. Fig. 4 is a cross-section on the line $x\ x$ of Fig. 3. Fig. 5 is a rear view of a shovel and its supporting-block detached from the plow-foot. Fig. 6 is a front view of a wedge for adjusting the shovels. Fig. 7 shows the means employed for securing the brace to the side beams, and Fig. 8 is a broken section of the adjustable brace-rods connecting the handles and side beams.

Letters of like name and kind refer to like parts in each of the figures.

My invention relates to a class of implements called "double-shovel plows;" and it consists, principally, in the means employed for rendering the shovels adjustable upon the plow-feet laterally, and also in line with the draft. It also consists in the employment of a spring-support for the fender in the devices used for giving lateral adjustment to the side beams and shovels.

In the annexed drawings, A and A' represent the side beams, one of which, A, extends forward and forms a hook, $a$, for attaching the team thereto, immediately in rear of which is hinged the front end of the other beam, A', so as to have a horizontal movement. The rear ends of said beams are curved downward and forward, so as to form feet C C for the support of the shovels.

The shovels D D are of the usual form, and are each secured to a block, E, by means of bolts $e$ and $e'$ passing through the upper and lower ends of said block, the opening in which for the passage of the lower bolt is slotted transversely, so as to permit the lower end of said shovel to have a like motion, the upper bolt serving as a pivot upon which said shovel turns. A transverse slot, $x'$, near the center, lengthwise of the block E, permits the passage of the bolt F, by means of which the shovel and block are attached to the plow-foot, said slot being widened next to the shovel, so as to contain the head of said bolt. As seen in Fig. 4, the plow-foot is cylindrical, to which form the rear side of the block E conforms. It will be seen that by this arrangement the lower end of the shovel may be adjusted to either side laterally, and secured in a position at an angle to a perpendicular line, so as to cause the plow to run to the right or left, as may be desired; but experience having shown that it is equally desirable to have the forward inclination of said shovel varied, the following, described means are employed for securing such adjustment: A wedge, G, having a concave and a convex side corresponding with the front of the plow-foot and the rear of the block, respectively, is inserted from below between said block and plow-foot, so as to spread them apart at their lower ends, and as said wedge is pressed upward or withdrawn the face of the shovel will present a greater or less angle to a perpendicular line. Upon the forward side of the wedge are provided two transverse ribs, $g\ g$, which fit into corresponding recesses in the rear face of the block E and firmly hold said wedge in place. In order to adjust the wedge, the bolt F is slackened and the block and foot separated until the ribs $g\ g$ are disengaged from the recesses, said wedge moved up or down until said ribs and recesses again correspond, and the bolt again tightened. It will be evident that the degree and amount of adjustment of the shovel will depend upon the taper of the wedge and the distance apart of the ribs, and consequently recesses. Each shovel can also be adjusted to the right or left, so as to bring its face at an angle to instead of parallel with a line at a right angle to the line of draft by means of the slot $x'$, through which the bolt F is passed, said slot permitting the block to revolve upon the cylindrical portion of the foot C, said adjustment being for the purpose of giving the plow a tendency to run to either side of the line of draft.

The handles H H are forked, as shown in Fig. 1, and are each connected to the side beams at two points by means of bolts. A series of holes are provided in the rear par of the fork, so as to permit the rear end of said handles to be adjusted vertically to any desired height. The inner end of the bolt $i$, securing the front end of the handle, is attached to and forms a part of a brace-bar, I, which overlaps that from the opposite side, I', and is secured thereto by means of a bolt passing through both. In order that said brace may be shortened or lengthened, so as to adjust the plows to the desired distance apart, a slot is provided in one of said bars for the passage of the bolt. A similar brace, K, connects the handles near their rear end.

L represents a brace secured at either end to the beam A, and passing over the bolt $i$ upon the end of the adjustable brace I, for the purpose of retaining the latter securely in position when the side beam A is removed. This arrangement permits said side beam to be taken off, the handle replaced upon the brace I, and a single-shovel plow formed.

Connected with the side beam A by means of the bolt $i$ is a spring-support, M, which is curved outward and downward, and has attached to its lower end a fender, N. A series of holes, $m\ m$, &c., in the support M permits its vertical adjustment. This manner of attaching the fender permits it to spring out and relieve the plow from large clods, accumulations of corn-stalks, or other obstructions, and relieves the driver of much hitherto unnecessary labor in clearing away said obstructions.

This plow possesses many advantages, among which are: First, by reason of the peculiar adjustability of the shovels the plow can be caused to run near to or farther from the corn, in order to accommodate the horses, some of which will naturally crowd against, while others will keep away from, said corn; second, by means of the wedge, the shovels can be given a greater or less inclination from a vertical line, in order that a large or small quantity of earth may be thrown up, as may be desired; third, the arrangement of the adjustable braces I, K, and L permits the plow to be changed from double to single with but slight labor; fourth, the means employed for securing the fender to the plow greatly adds to its efficiency and much lessens the labor of the driver; fifth, while possessing all of the hereinbefore-described advantages, the plow is so simple in construction as to enable it to be furnished at as small a cost as other plows capable of performing an equal amount of work.

Having thus fully set forth the nature and merits of my invention, what I claim as new, and desire to secure by Letters Patent, is—

1. The within-described plow-stock, consisting of the side beams, A and A', feet C and C, handles H and H, and braces I, K, and L, all constructed and arranged substantially as and for the purpose shown.

2. The devices employed for rendering the shovels adjustable, consisting of the block E, bolts $e$, $e'$, and F, and the wedge G, substantially as shown and specified.

3. The combination of the beam A and braces I and L, substantially as and for the purpose shown.

4. The fender N, when connected to the plow by means of the flat adjustable spring-support M, as shown, and for the purpose specified.

In testimony that I claim the foregoing I have hereunto set my hand this 5th day of August, 1869.

G. W. LAWBAUGH.

Witnesses:
 H. A. TEBBETTS,
 J. S. BUCKLES.